United States Patent [19]

Cooper et al.

[11] Patent Number: 4,567,773
[45] Date of Patent: Feb. 4, 1986

[54] PRESSURE TRANSDUCER SYSTEM

[75] Inventors: Jack B. Cooper; David T. Harrje, both of Princeton, N.J.

[73] Assignee: Energy Utilization Laboratories, Inc., Baltimore, Md.

[21] Appl. No.: 568,394

[22] Filed: Jan. 5, 1984

[51] Int. Cl.$^4$ ............................................. G01L 19/04
[52] U.S. Cl. ........................................ 73/708; 73/431
[58] Field of Search .......................... 73/708, 724, 431

[56] References Cited
U.S. PATENT DOCUMENTS
4,198,868 4/1980 Runyan ................................. 73/708

FOREIGN PATENT DOCUMENTS
1055350 2/1954 France ................................. 73/708
0128132 10/1980 Japan ................................. 73/708

Primary Examiner—Donald O. Woodiel
Attorney, Agent, or Firm—Michael W. York

[57] ABSTRACT

A pressure transducer system including a pressure transducer, a heater and a temperature sensor and controller for controlling the heater. A thermal lead network is also provided that has a resistor that is physically located in close proximity to the temperature sensor and thermally bonded so that the heat that this resistor generates reaches the temperature sensor well in advance of the heat that would ultimately reach the temperature sensor from the heater. In view of this arrangement, this pressure transducer system is capable of making precise measurements in a time-varying temperature environment.

7 Claims, 19 Drawing Figures

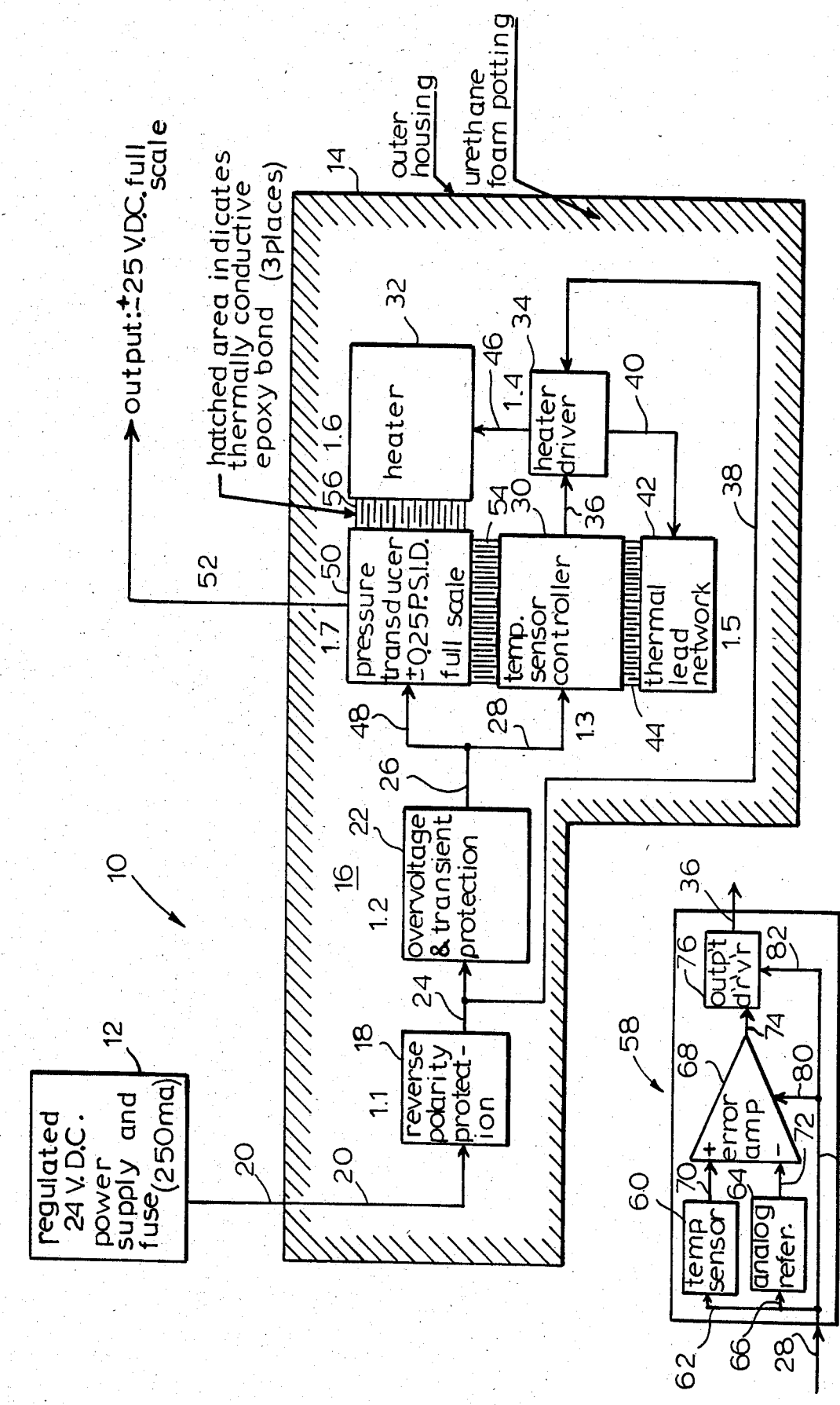

NOTE: fuse is located outside the assy housing

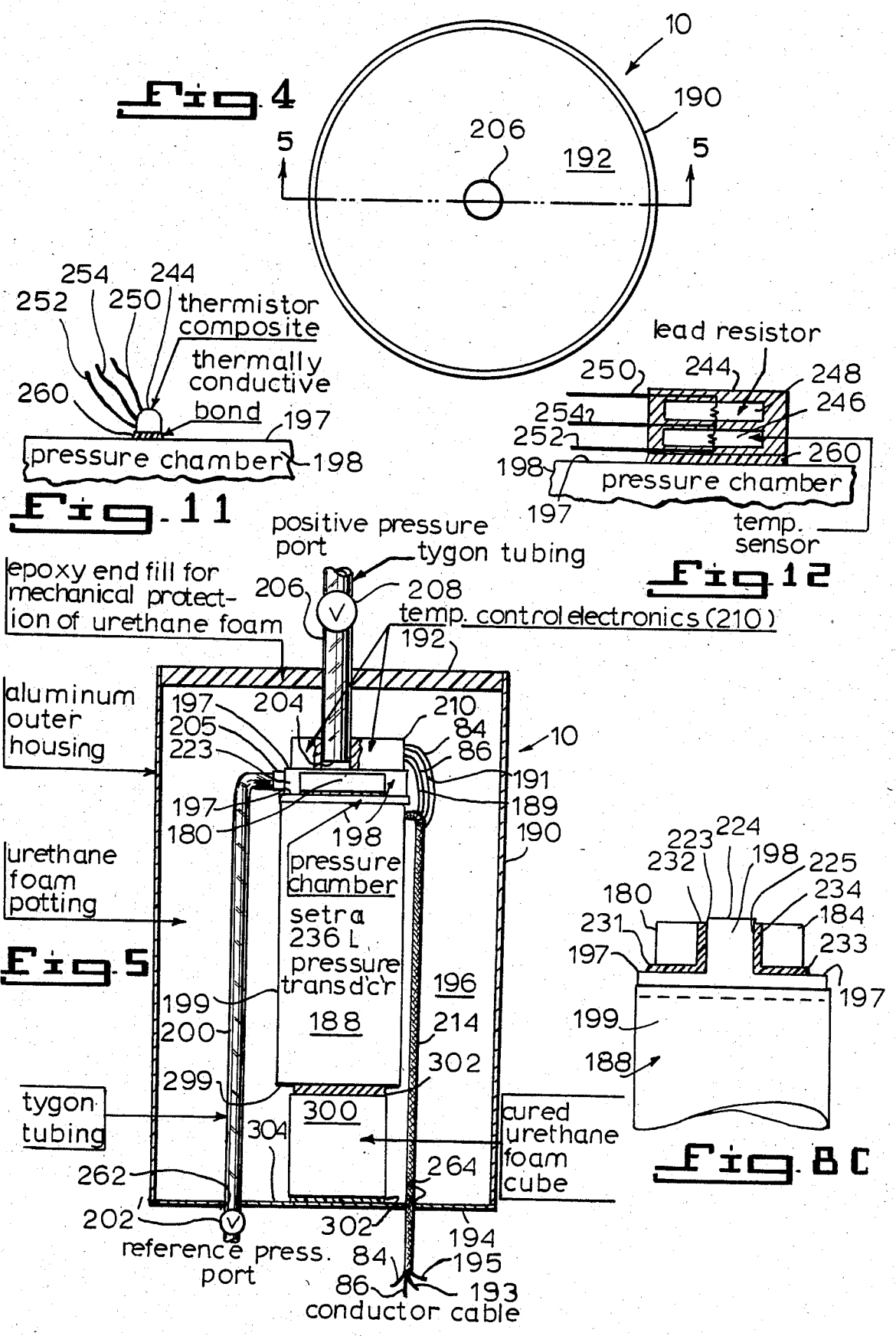

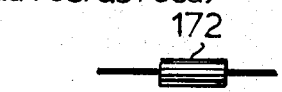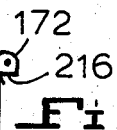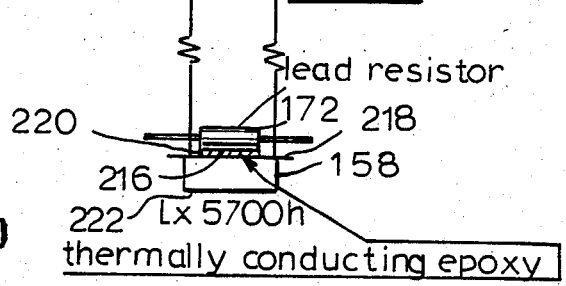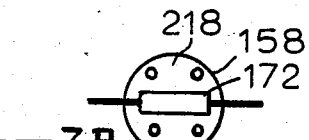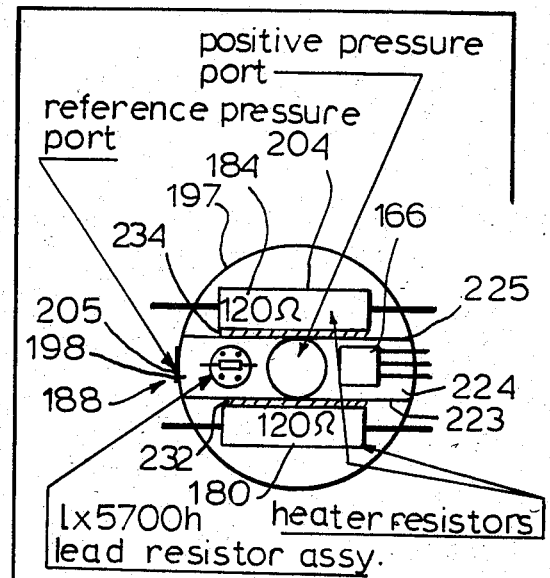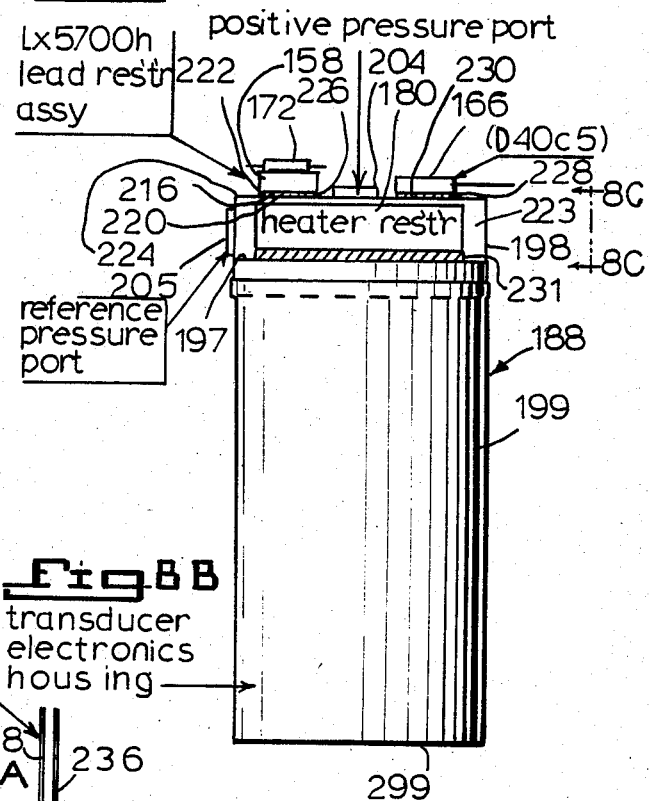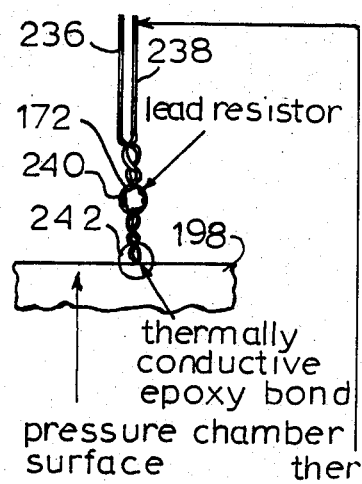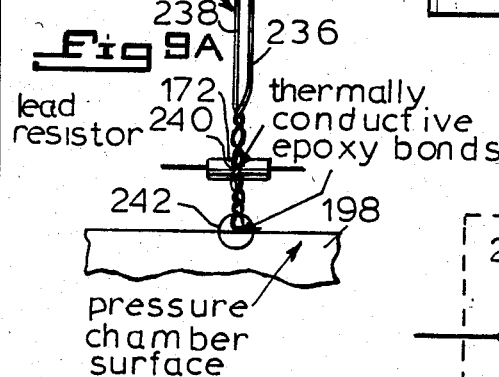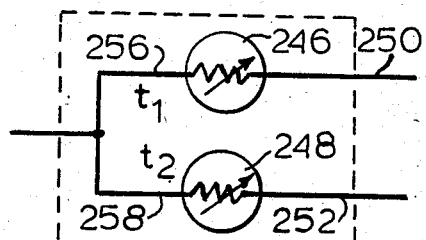

PRESSURE TRANSDUCER SYSTEM

BACKGROUND OF THE INVENTION

In the past it has been difficult if not impossible to have accurate pressure transducers. This difficulty has been traced to zero shift of the transducer as a function of temperature and zero shift as a function of time.

Past attempts to solve the thermal problems have included the use of thermally dependent components in the pressure measuring circuitry to compensate for the thermal vagaries of both the electronic and mechanical components of the transducer. However, such attempts have resulted in compensation which is at best approximate. Also, in the past the time varying zero shift problems have been attempted to be solved by extremely long "burn-in" times coupled with periodic zero checks and appropriate readjustments. It should be noted that past thermal compensation attempts would only give approximate compensation for a steady-state thermal situation, and at best poor or useless results in a transient thermal situation. This is because the thermal time constants of the mechanical assembly of the transducer are commonly much longer than those of the electrical components of the transducer. This temperature compensation problem is made even worse since the spatial distribution of the components of the transducer give rise to severe thermal gradients in a time-varying temperature situation.

These problems associated with zero shifts related to time and temperature changes have been overcome with the present pressure transducer system invention which greatly reduces or eliminates zero shifts which are functions of temperature and time. Moreover, the invention reduces or eliminates thermal gradients associated with spatial distribution of the transducer system components, allowing accurate and precise measurements in a time-varying thermal environment.

SUMMARY OF THE INVENTION

This invention relates to pressure transducers and more particularly to pressure transducers in which an attempt has been made to achieve thermal stabilization.

Accordingly, it is a primary object of the present invention to provide a pressure transducer system which is thermally stabilized.

It is also an object of the invention to provide a pressure transducer system which can be subjected to varying temperatures without affecting the zero or calibration of the pressure tranducer system.

It is also an object of the invention to provide a pressure transducer system in which the zero or calibration does not change appreciably with time.

It is also an object of the invention to provide a pressure transducer system which does not utilize thermally dependent components as part of the pressure measuring system to attempt to obtain thermal stabilization.

It is another object of the invention to provide a pressure transducer system which does not require long "burn-in" times and periodic zero and calibration checks.

It is another object of the invention to provide a pressure transducer system with reduced thermal gradients.

It is also an object of the invention to provide a pressure transducer system which reduces the thermal transient problems associated with the spatial distribution of its components.

It is also an object of the invention to provide a pressure transducer system in which certain components are bonded together by a thermally conductive bond.

It is also an object of the invention to provide a pressure transducer system which is maintained at a temperature above the surrounding environment.

It is also an object of the invention to provide a pressure transducer system which utilizes "thermal servo" means to assist in maintaining the pressure transducer at a substantially constant elevated temperature.

It is also an object of the invention to provide a pressure transducer system which utilizes a "thermal servo" having thermal phase lead feedback compensation to assist in maintaining the pressure transducer at a substantially constant elevated temperature.

It is also an object of the invention to provide a pressure transducer system which utilizes thermal insulation to assist in maintaining the transducer at a substantially constant elevated temperature.

It is also an object of the invention to provide a pressure transducer system in which the heat generated by the transducer electronics contributes to the heating of the transducer to maintain it at an elevated temperature.

It is also an object of the invention to provide a pressure transducer system in which the temperature control electronics is placed inside the environment it is controlling.

It is another object of the invention to provide a pressure transducer system which includes means for protection from damage due to power supply reverse polarity.

It is another object of the invention to provide a pressure transducer system which includes means for protection from overvoltage and high voltage transients.

The present invention provides a pressure transducer system which includes pressure exposure means for being exposed to the fluid whose pressure is to be sensed, sensing means operatively connected to the pressure exposure means for sensing the pressure of the fluid exposed to the pressure exposure means and means operatively connected to the pressure exposure means and the pressure sensing means for reducing pressure sensing errors.

BRIEF DESCRIPTION OF THE DRAWINGS

The invention will be hereinafter more fully described with reference to the accompanying drawings in which:

FIG. 1 is a block diagram of the pressure transducer system invention;

FIG. 2 is a block diagram of an alternative of a portion of the pressure transducer system set forth in FIG. 1;

FIG. 4 is a top plan view showing the physical construction of the pressure transducer system set forth in FIGS. 1 through 3;

FIG. 5 is a cross-sectional view of the pressure transducer system set forth in FIG. 4 taken substantially on the line 5—5 thereof;

FIG. 6A is a side elevational view of a component of the circuit illustrated in FIG. 3 showing its configuration as it is received;

FIG. 6B is an end elevational view of the component illustrated in FIG. 6A;

FIG. 6C is a side elevational view of the component illustrated in FIG. 6A after it has been prepared for bonding;

FIG. 6D is an end elevational view of the component illustrated in FIG. 6C;

FIG. 7A is a side elevational view of the component illustrated in FIGS. 6C and 6D showing how it is bonded to another component set forth in FIG. 3;

FIG. 7B is a top plan view of the components illustrated in FIG. 7A;

FIG. 8A is a top plan view of a portion of the structure set forth in FIG. 5 illustrating how the components set forth in FIGS. 7A and 7B and other components of FIG. 3 are bonded;

FIG. 8B is a side elevational view of the apparatus illustrated in FIG. 8A;

FIG. 8C is a side elevational view of a portion of the structure illustrated in FIG. 8B taken in the direction of the line 8C—8C thereof with certain components removed for clarity;

FIG. 9A is a side elevational view of a component which could form part of the block diagram of FIG. 2 illustrating how it would be bonded to a portion of the structure illustrated in FIG. 5;

FIG. 9B is an end elevational view of the structure illustrated in FIG. 9A;

FIG. 10 is a schematic representation of a component which could be used in connection with the circuit set forth in FIG. 3;

FIG. 11 is an end elevational view of another component which could form part of the block diagram of FIG. 2 illustrating how it would be bonded to a portion of the structure illustrated in FIG. 5; and FIG. 12 is a side elevational sectional view of the component set forth in FIG. 11 illustrating its dual functional roles.

DETAILED DESCRIPTION OF THE PREFERRED EMBODIMENTS

Figure 3:
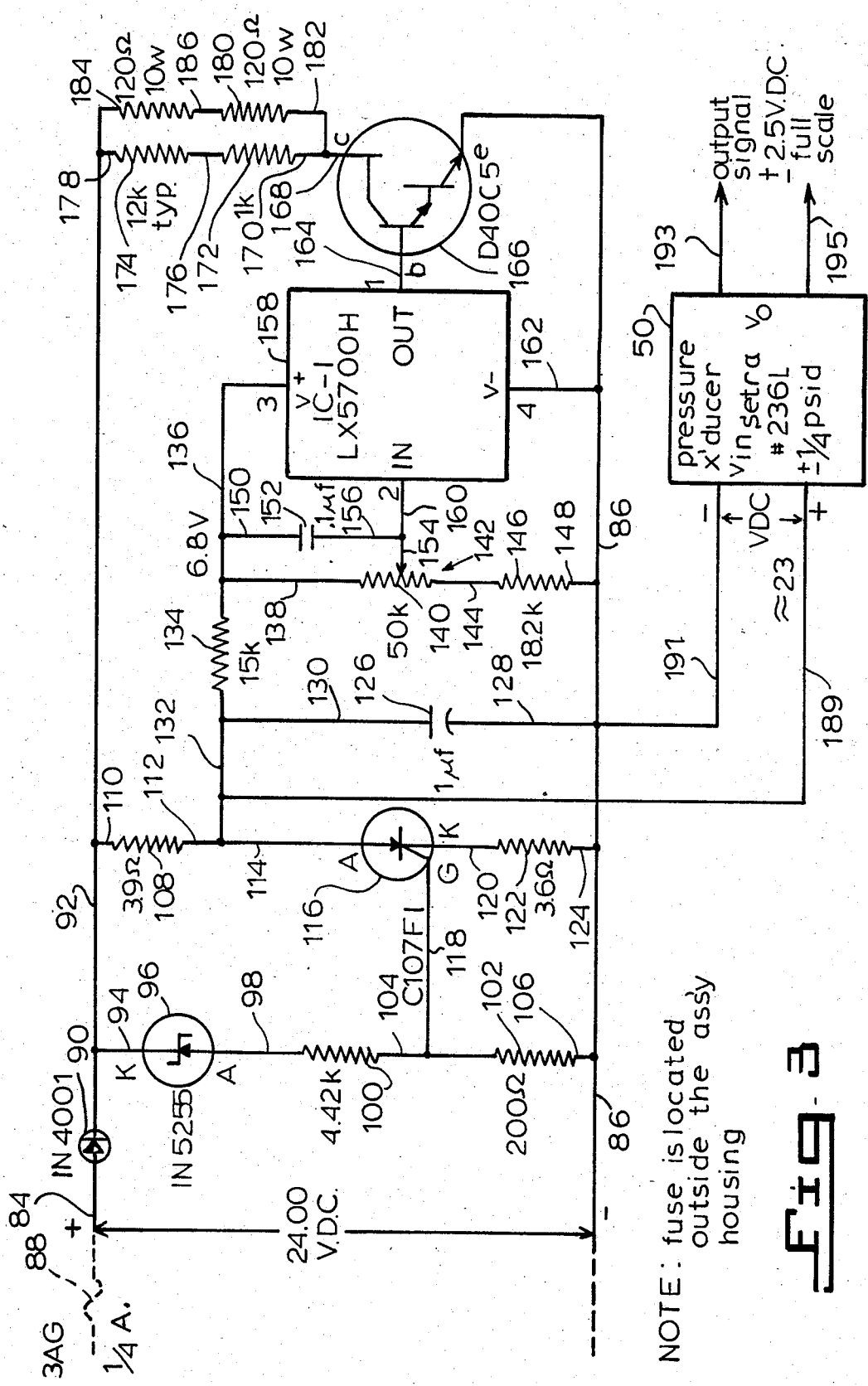
FIG. 3 is a circuit diagram of the pressure transducer system set forth in FIG. 1.

Referring first to FIG. 1, the pressure transducer system is illustrated and is designated generally by the number 10. The pressure transducer system 10 is powered by a power supply 12. This power supply 12 is a standard 24 VDC regulated power supply with current limiting, as made by numerous manufacturers including the Acopian Corporation of Easton, Pa. This power supply 12 will include a 250 ma. fuse. One power supply 12 may service more than one pressure transducer system 10 as long as 125 ma. of additional capacity is allowed for each added pressure transducer system 10 and the positive line to each transducer includes a 250 ma. fuse. The power supply 12 may be physically remote from the pressure transducer system 10 with distances of over 700 feet easily achieved if the power supply 12 is equipped for remote sensing. In any event, the power supply 12 is always located outside the outer housing 14 of the pressure transducer system 10. The fuse is essential to the proper functioning of the overvoltage and transient protection block 22 that will be hereinafter described and the power supply 12.

The potting of the pressure transducer system 10 electronics in urethane foam, designated by the number 16, inside an outer housing 14 is essential to this invention, consequently repairs to the electronics can be made only at considerable expense. It was therefore deemed prudent to include a unilateral circuit element for reverse polarity protection to preclude component damage from inadvertant power supply polarity reversal. The reverse polarity protection element is designated by the number 18 and is connected to the power supply 12 by the conductor 20 which passes through the outer housing 14 and urethane foam 16.

Most regulated power supplies which would be used for the power supply 12 employ a series-pass control element working from a voltage as high as twice the rated output of the supply. It is therefore prudent to protect against possible failure of the control element in the short-circuit mode. In addition, stray shunt capacitances and series inductances make possible the coupling of fast high voltage spikes (transients) from the power line to the regulated output. This advises high frequency filtering of the power supply output. When done physically at the pressure transducer input, transient pickup on the leads from the power supply 12 is also minimized. The output from the reverse polarity protection block 18 is connected to the overvoltage and transient protection block 22 by the conductor 24.

The output from the overvoltage and transient protection block 22 is sent via the conductors 26 and 28 to block number 30 which is the temperature sensor and controller. Basically, this block 30 consists of a stable zener voltage reference and regulator, a semiconductor temperature sensor, a frequency compensated operational amplifier and output drive transistor fabricated on a single monolithic silicon chip. It is an integrated circuit of the LX5600/LX5700 type available from the National Semiconductor Corporation of Santa Clara, Calif.

The buffered output of the temperature controller 30 is insufficient to drive the heater which is represented by the block numbered 32. Therefore, a power darlington stage is included to provide the necessary signal and power gain and is represented by the heater driver block numbered 34. As illustrated, the output of the temperature sensor and controller 30 is fed to the heater driver via the conductor 36. Power is also supplied to the heater driver 34 via the conductor 38 which is connected to the conductor 24. The heater driver 34 output is sent via the conductor 40 to a thermal lead network block number 42. This thermal lead network 42 is an important part of the invention, and consists of two resistors which will be hereinafter more fully described. One, the lead resistor (⅛ watt), is intimately attached by a thermally conductive epoxy bond, represented by the number 44, substantially directly to the temperature sensor controller 30. The other resistor, of suitable value, is electrically connected in series with the lead resistor. It is used to control the amount of thermal phase lead feedback compensation applied to the sensor controller 30 through the lead resistor.

The heater driver 34 is connected to the heater 32 by the conductor 46. The heater 32 consists of two power resistors bonded in intimate thermal contact with the transducer block containing the pressure ports and a diaphram assembly. The metal bodies of the resistors are machined on two sides prior to bonding to insure a close fit. The resistors and their bonding will be hereinafter described in further detail.

The output of the overvoltage and transient protection block 22 which is present on the conductor 26 is also sent via the conductor 48 to a pressure transducer represented by the block numbered 50. The pressure transducer 50 is a standard model #236L available from Setra Systems, Incorporated of 45 Nagog Park, Acton, Mass. 01720. It is a differential pressure transducer with a full scale range of +/−0.25 psid (differential). It uses the capacitance principle to detect small diaphram deflections caused by pressure differences between the diaphram sides. The necessary electronics to produce a full scale output of +/−2.5 VDC. are contained in a housing attached to the reference port side of the pressure chamber of the pressure transducer 50. The output from the pressure transducer 50 is sent by the conductor represented by the number 52 which passes through the urethane foam 16 and the outer housing 14 to a suitable reading or recording device (not shown) which is known in the art and does not form part of this invention. It should be noted that the pressure transducer 50 is connected to the temperature sensor and controller 30 and the heater 32 by respective thermally conductive epoxy bonds designated by the respective numbers 54 and 56.

FIG. 2 is a block diagram of an alternative for the temperature sensor and controller block 30 of FIG. 1 which is designated generally by the number 58. The alternative temperature sensor and controller 58 comprises a temperature sensor 60 which may be of many types known in the art, such as thermistor, platinum resistance, semiconductor or thermocouple, with or without signal conditioning so as to provide an analog signal (of suitable amplitude) as a function of temperature. This function may be direct, inverse, linear or non-linear. This temperature sensor 60 is connected to the conductor 28 via the conductor 62. The temperature sensor and controller 58 also comprises an analog reference 64 which is connected to the conductor 62 by the conductor 66. The analog reference 64 provides the selectable signal of suitable magnitude and type that is used to control the operating temperature. The analog reference 64 may be a suitable reference zener diode or an adjustable precision voltage regulator of the integrated circuit type such as the uA723, available from the Fairchild Semiconductor Division of Fairchild Camera and Instrument Corporation, Mountainview, Calif.

The temperature sensor and controller 58 also comprises an error amplifier 68 which is connected to the temperature sensor 60 and the analog reference 64 by the respective conductors 70 and 72. The error amplifier 68 comprises one or more integrated circuit operational amplifiers of type LM301A available from the National Semiconductor Corporation of Santa Clara, Calif. and connected so as to provide the output driver 76 with an error signal of suitable magnitude and phase. The output from the error amplifier 68 on the conductor 74 is connected to the output driver or buffer 76, a small signal general purpose transistor such as type 2N3904, available from many semiconductor manufacturers. The output from the output driver 76 is sent via the conductor 36 to the heater driver 34 as illustrated in FIG. 1. A portion of the input on the conductor 28 is fed via the conductor 78 and the respective conductors 80 and 82 to the error amplifier 68 and the output driver 76 for the purpose of providing operating power. The error amplifier 68 compares the temperature sensor 60 signal with the analog reference 64 signal and amplifies the difference so as to provide an output signal proportional to the error between the sensed and desired temperature. The output buffer or driver 76 increases the power level of the error signal used to control the heater driver 34 and the heater 32 that maintain the desired temperature.

FIG. 3 is a circuit diagram of the pressure transducer system 10 set forth in FIG. 1. As illustrated 24 Volts DC are applied between the positive conductor 84 and the negative conductor 86 by the power supply illustrated in FIG. 1. The conductor 84 is connected to a ¼ ampere fuse 88 which is illustrated in dotted lines since it is located outside the housing 14 of the pressure transducer system 10. A diode 90 is in turn connected to the conductor 92. The conductor 92 is connected to the conductor 94 which is in turn connected to the cathode of a 1N5255 zener diode 96 which also has its anode connected to the conductor 98. The conductor 98 is connected to a 4.42 kilohm resistor 100 which is in turn connected to a 200 ohm resistor 102 via the conductor 104. The resistor 102 is is also connected to the conductor 86 by the conductor 106. A 3.9 ohm resistor designated by the number 108 is connected to the conductor 92 by the conductor 110 and the resistor 108 is in turn connected via the conductors 112 and 114 to the anode of a C107F1 thyristor, as made by G.E., Semiconductor Dep't., Electronics Park, Electronites, PK, Syracuse, NY, 13021 (Syracuse) 116. The gate of the thyristor 116 is connected to the conductor 104 via the conductor 118 and the cathode of the thyristor 116 is connected to the conductor 86 via the conductor 120, a 3.6 ohm resistor 122 and the conductor 124. A 1 microfarad capacitor 126 is also connected via the conductor 128 to the conductor 86 and to the junction of the conductors 112 and 114 via the conductors 130 and 132.

The previously described components 96, 100, 102, 108, 116, 122 and 126 and the associated conductors comprise the overvoltage and transient protection illustrated by the block 22 in FIG. 1. The fuse 88 also functions with these components. These components comprise what is known as a "crowbar" circuit. Zener diode 96 prevents current flow through resistors 100 and 102 until the applied voltage on conductor 92 exceeds 28 V. Resistors 100 and 102 form a voltage divider network to protect the gate circuit of sensitive gate thyristor 116. If the applied 24 Volts, supplied by a regulated power supply 12 should increase because of component failure above 30 Volts, then thyristor 116 is turned on and goes into full conduction. Thyristor 116 forms a voltage divider with the resistor 108 and the resistor 122 to limit the voltage applied to the pressure transducer 50 and to the temperature sensor and controller assembly 30 to approximately 16 Volts. This action takes place within a few microseconds and protects those components until fuse 88 blows about 15 milliseconds later. Fuse 88 is physically located at the power supply 12 and can be easily replaced after the power supply 12 has been repaired. Damage will not occur to the pressure transducer 50 until a voltage in excess of 32 Volts has been applied for tens of microseconds. Resistors 108 and 122 also limit the current to the thyristor 116 to a safe value. Resistor 108 and capacitor 126 act as an interference filter for the pressure transducer 50 and the IC-1 designated by the number 158. In addition, they also form a "snubber network" to prevent thyristor 116 from turning on because of the very high rate of rise of anode-cathode voltage at power up. Thus, thyristor 116 is used as a very high speed switch to keep the applied voltage within safe limits and to blow the fuse 88 and hence remove power from the pressure transducer system 10.

As illustrated in FIG. 3, the conductor 132 is connected to a 15 kilohm resistor 134 which is in turn connected to the conductor 136. The conductor 136 is connected via the conductor 138 to the resistor portion 140 of a cermet potentiometer 142. The resistor portion 140 is also connected to the conductor 86 via the conductor 144, the 18.2 kilohm metal film resistor 146 and the conductor 148. The conductor 136 is also connected to a conductor 150 which is connected to the 0.1 microfarad capacitor 152 which is in turn connected to the variable contact 154 of the variable potentiometer 142 via the conductor 156. The variable contact 154 is connected via the conductor 160 to the IN terminal of an integrated circuit assembly IC-1 designated by the number 158. Power is supplied through resistor 134 and conductor 136 to the V+ terminal of IC-1 158, enabling its internal regulator to develop 6.8 Volts at that terminal. The V− terminal of the IC-1 158 is connected to the conductor 86 via the conductor 162. The OUT terminal of IC-1 158 is connected to the conductor 164.

The previously described components 134, 142, 146, 152 and 158 and the associated conductors comprise the temperature sensor and controller means illustrated by block 30 in FIG. 1. The IC-1 158 is a type LX5700H integrated circuit housed in a TO-46 metal can package which is available from the National Semiconductor Corporation of Santa Clara, Calif. The IC-1 158 includes a temperature sensor, stable zener voltage reference and regulator, frequency compensated operational amplifier and output drive transistor fabricated on a single monolithic chip mounted to the base of the package. The output of the IC-1 158 is directly proportional to temperature in degrees Kelvin at 10 milivolts per degree Kelvin. By connecting the operational amplifier as a voltage comparator the output driver switches as the temperature traverses the set point. This converts the integrated circuit into an on-off temperature controller. The internal 6.8 Volt Zener diode, in conjunction with external resistor 134, provides a stable reference voltage as well as a regulated operating voltage for the chip. Cermet potentiometer 142 and metal film resistor 146 allow selection of the set point and therefore precise setting of the operating temperature. By adjusting potentiometer 142 for 3.33 Volts between pins 2 and 3 of the IC-1 158 a pressure chamber temperature of 60 degress Celsius can be established. This is the highest pressure chamber temperature that can be used without causing overheating of the pressure transducer 50 electronics. The IC-1 158 is operated at the lowest possible power level to keep its self-heating error less than ½ degree Celsius.

As illustrated in FIG. 3, the heater driver means represented by block 34 in FIG. 1 comprises a General Electric D40C5 medium power Darlington transistor 166 whose emitter is connected to the conductor 86, whose base is connected to the OUT terminal of IC-1 158 through wire 164 and whose collector is connected through conductors 168, 170 and 182 to a network of resistors which will be hereinafter described in detail. The Darlington transistor 166 is mechanically and thermally bonded to the pressure chamber for heat sinking and to take advantage of its waste heat by using Delta Bond 152 thermally conductive epoxy cement available from Wakefield Engineering, Incorporated of Wakefield, Mass.

As illustrated in FIG. 3, the collector of the Darlington transistor 166 is connected to the conductor 168 which is in turn connected to the 1 kilohm resistor 172 by the conductor 170 which is in turn connected to a 12 kilohm (typical) resistor 174 by the conductor 176 which is also connected to the conductor 92 by the conductor 178. These components 172 and 174 and the associated conductors comprise the thermal lead network means illustrated by the block numbered 42 in FIG. 1. The resistor 172 is mechanically bonded to the base of the package of IC-1 158, where it is located in substantial proximity to the temperature sensor contained within the IC-1 158 that also forms part of the temperature sensor and controller means illustrated by the block 30 in FIG. 1. The resistor 174 is a lead control resistor which is connected in series with the lead resistor 172 to control the exact heat delivered by resistor 172 to the IC-1 158. The series combination of resistor 174 and resistor 172 is connected directly in parallel with the heater 32 (FIG. 1). As illustrated in FIG. 1, power is therefore delivered to the thermal lead network 42 whenever power is delivered to the heater 32. The resistor 172 is called a lead resistor since, due to its physical location and thermal bonding in close proximity to the temperature sensor contained within the IC-1 158, it generates heat that reaches this sensor well in advance of the heat that would be ultimately reaching the sensor from the heater resistors 180 and 184 that will be hereinafter described in detail.

As illustrated in FIG. 3, the conductor 168 is connected to a 120 ohm 10 watt heater resistor 180 by the conductor 182. The heater resistor 180 is in turn connected to another 120 ohm 10 watt heater resistor 184 via the conductor 186 and the heater resistor 184 is connected to the conductor 92. The two series connected heater resistors 180 and 184 are military sytle RE65 metal cased resistors which are machined and then bonded to the transducer pressure chamber in a manner which will be hereinafter described in detail and they comprise the heater represented by the number 32 in FIG. 1.

Also as illustrated in FIG. 3, the negative conductor 86 is connected to the negative power input contact of a standard Setra Model 236L differential pressure transducer 50 by the conductor 191. The positive power input terminal of the transducer 50 is connected by the conductor 180 to the conductor 132. Approximately 23 Volts D.C. is supplied on the conductors 191 and 189. The signal output voltage from the transducer 50 is fed by the conductors 193 and 195 through the urethane foam 16 and the outer housing 14 as indicated in FIG. 1 where the conductors 193 and 195 form part of the cable 52 into a suitable recording or indicating device (not shown) which is known in the art. Approximately 23 Volts D.C. power is supplied from the anode of the thyristor 116 and common conductor 86 to the pressure transducer 50. The full scale output signal from the pressure transducer 50 is +/−2.5 Volts D.C. differential with a common mode voltage of approximately +7.5 Volts D.C. The pressure transducer 50, with its temperature control system mounted to its pressure chamber, is foamed in place in the center of an aluminum housing 14 as will hereinafter be described in detail.

FIG. 4 is a top plan view of the physical construction of the pressure transducer system 10 set forth in FIGS. 1 through 3 minus the power supply 12. The transducer system 10 includes an approximately four inch inside diameter by approximately six inch long cylindrical aluminum housing 190 that has approximately a 3/16 inch wall thickness. The top of the aluminum housing 190 is covered with an approximately ⅛ inch thick epoxy cement layer 192.

FIG. 5 is a sectional view of the pressure transducer system 10 illustrated in FIG. 4 taken substantially on the line 5—5 of FIG. 4. As illustrated in FIG. 5, the bottom of the aluminum housing 190 is closed by a ¼ inch thick aluminum plate 194 which forms part of the housing 190. The housing 190, its plate 194 and the epoxy layer 192 are represented schematically in FIG. 1 as number 14. The Setra 236L pressure transducer 188 that is represented by the block 50 in FIGS. 1 and 3 is centrally located within the housing 190 and is surrounded by a low density urethane foam 196 represented schematically by the number 16 in FIG. 1. The foam insulates the pressure transducer 188, retains it in place and protects it physically from shock and the like. The pressure transducer 188 has a pressure chamber 198 located on its upper end. A pressure chamber reference port 205 is connected to a segment of Tygon tubing 200 which extends outside the housing 190 to a reference pressure port valve 202. Tygon tubing is available from the Norton Company, Plastics & Synthetics Division, Akron, Ohio. A pressure chamber positive pressure port 204 is connected to a similar segment of Tygon tubing 206 which extends outside the epoxy layer 192 which closes the housing 190 to a valve 208. The heater resistors 180 and 184 are thermally and mechanically bonded to the pressure chamber 198 as illustrated in FIGS. 8A, 8B and 8C in a manner that will be hereinafter described in detail.

A temperature control electronics package 210 is located on top of the pressure chamber 198 and it is supplied power via the conductors 84 and 86 which are connected to the four conductor cable 214 which also sends information from the pressure transducer 188. This four conductor cable 214 contains the signal conductors 193 and 195 and the power conductors 84 and 86 illustrated in FIG. 3. Just before the four conductor cable 214 enters the housing 199 of the pressure transducer 188 it is entered into to gain access to the conductors 84 and 86 which are then cut. Two conductors are connected, one to each end, to the cut conductor 84 and two conductors are connected, one to each end, to the cut conductor 86 by splicing. These conductors are conductor 84 and conductor 189 that are spliced to the conductor 84 and conductor 86 and conductor 191 that are spliced to the conductor 86. The conductors 84 and 86 are connected to the respective positive and negative terminals of the power supply 12 and the conductors 189 and 191 are the respective positive and negative input conductors to the transducer 188. As illustrated in FIG. 3, conductor 191 is connected to conductor 86 at the emitter of Darlington D40C5 166. Conductor 189 is connected to conductors 112, 114, and 132 at the anode of thyristor C107F1. Conductor 84 is connected to the anode of reverse polarity protection diode 1N4001 90.

FIGS. 6A, 6B, 6C and 6D illustrate how the lead resistor 172 is prepared for bonding. As indicated in FIGS. 6A and 6B the lead resistor 172 is of general cylindrical shape as it is received. However, as indicated in FIGS. 6C and 6D part of the cylindrical insulated body of the lead resistor 172 is filed or milled to give it a substantially flat surface 216. The proper size flat surface 216 is obtained by filing or milling away a sufficient amount of cylindrical lead resistor 172 which is approximately equal to one third of the radius of its circular end, but never enough to expose the actual resistance element of the lead resistor 172.

As illustrated in FIGS. 7A and 7B, the flat surface 216 of the lead resistor 172 is bonded to the base surface 218 of the IC-1 58 with a thermally conducting epoxy 220 which is available from Wakefield Engineering, Incorporated of Wakefield, Mass.

FIGS. 8A and 8B illustrate how the assembly illustrated in FIGS. 7A and 7B and other components are bonded to the pressure chamber 198 of the pressure transducer 188. As illustrated, the surface 222 of the assembly is bonded to the top 224 of the pressure chamber 198 by a thermally conductive epoxy bond 226 which is made from the same epoxy as the bond 220. The bottom (heat sink) 228 of the Darlington transistor 166 is bonded to the upper surface 224 of the pressure chamber 198 on the other side of the positive pressure port 204 with a thermally conductive epoxy bond 230 which is made from the same epoxy cement as the bond 220. The two heater resistors 180 and 184 are bonded to the sides 223 and 225 of the pressure chamber 198 (see FIGS. 8A and 8C) by the respective thermally conductive bonds 232 and 234 which are made from the same epoxy as the bond 220. The two heater resistors 180 and 184 are also bonded to the surface 197 of the pressure chamber 198 by the respective thermally conductive bonds 231 and 233 which are made from the same epoxy as the bond 220. The application of bond 231 to heater resistor 180 and pressure chamber surface 197 is illustrated in FIGS. 8B and 8C. Bond 233 is applied in a like manner to heater resistor 184 and pressure chamber surface 197 and is illustrated in FIG. 8C.

FIGS. 9A and 9B illustrate how, if the temperature sensor 60 of FIG. 2 is a thermocouple, it should be bonded to the lead resistor 172. As illustrated, the thermocouple leads 236 and 238 would be wound around each other near the lead resistor 172 and also wound around the lead resistor 172. The portion of the leads 236 and 238 wound around the lead resistor 172 would be bonded to the lead resistor 172 by a thermally conductive epoxy bond 240. The wound leads 236 and 238 near the lead resistor 172 are also bonded to pressure chamber 198 by a thermally conductive bond 242. The bonds 240 and 242 are made using the same epoxy cement used for the previously described bond 220.

FIGS. 10, 11 and 12 illustrate the use of a thermistor composite 244 such as a YSI number 44018 available from Yellow Springs Instrument Company, Incorporated, Industrial Division, of Yellow Springs, Ohio, as a combination lead resistor and temperature sensor. A schematic representation of the thermistor composite 244 is illustrated in FIG. 10 and comprises two thermistor portions 246 and 248 which are connected by the conductors 250, 252, 254, 256 and 258. As illustrated in FIG. 11, the thermistor composite 244 is filed or ground flat and bonded to the pressure chamber 198 with a thermally conductive epoxy bond 260 which is made from the previously described epoxy cement. As illustrated in FIG. 12, one of the thermistor portions such as the thermistor portion 246 which is located closest to the pressure chamber 198 serves as the temperature sensor and the other thermistor portion 248 acts as the lead resistor.

The pressure transducer system 10 is made and used in the following manner. The various circuit components are connected as illustrated in FIGS. 1 through 3 and physically located and bonded as illustrated in and previously described with respect to FIGS. 4, 5, 6A, 6B, 6C, 7A, 7B, 8A, 8B, 8C, 9A, 9B, 10, 11 and 12 depending upon the embodiment of the temperature sensor and lead resistor which is utilized. In assembling the pressure transducer 188 within the housing 190, holes 262 and 264 are drilled in the base 194 of the housing 190 for the tubing 200 and the conductor 214. Before putting the pressure transducer 188 in place, a previously cured cube of urethane foam 300, approximately one inch on an edge, is bonded to the end surface 299 of the pressure transducer housing 188 with a fast setting epoxy cement 302 made by Hardman, Incorporated of Belleville, N.J. The opposite face of cube 300 is then bonded with the previously mentioned fast setting epoxy cement 302 to the center of the inside surface 304 of the housing 190, centrally positioned so as to align tube 200 and cable 214 with holes 262 and 264 respectively in the housing 190. Thus, the pressure transducer 188 is properly positioned and held in place within the housing 190 while the urethane foam 196, manufactured by Emerson and Cuming of Canton, Mass., is formed around the pressure transducer 188 is accordance with the instructions supplied by said manufacturer of urethane foam 196. After the urethane foam 196 is cured in place the epoxy layer 192 is added to seal the housing 190.

In order to use the pressure transducer system after it is suitably powered by turning on the power supply 12, the reference port valve 202 is opened at a desired location to obtain a reference pressure. Normally, the valve 202 would then be closed and the positive pressure port valve 208 would then be opened at a suitable location where it was desired to sample the pressure. Accurate pressure readings are assisted by the temperature control electronics 210 comprising the temperature sensor and controller 30, heater 32, heater driver 34, thermal lead network 42 and their electrical and thermal interconnections.

When the pressure transducer system 10 is stabilized at its internal operating temperature many thousand on-off cycles of the heater driver 34 occur per second to control the delivery of the required heat from the heater 32. However, when the pressure transducer system 10 is operating in an ambient temperature close to either extreme of its design ambient temperature range (0 Deg. F. to 105 Deg. F.) the heater driver 34 will be nearly continually on (at the cold end) or nearly continually off (at the hot end). As previously indicated, the output from the pressure transducer system 10 can be fed to any suitable readout, recording device or computer interface. In view of the thermal lead network with its lead resistor 172 and its associated location and thermal bonding the pressure transducer system does not require any thermally dependent components in the pressure measuring circuitry for thermal stabilization or long burn times and periodic zero and calibration checks.

It should be understood that the term "conductor" as used herein refers to any type of electron conductor including a wire, printed circuit, etched circuit, plated circuit, etc.

Although the invention has been described in considerable detail with reference to certain preferred embodiments, it will be understood that variations or modifications may be made within the spirit and scope of the invention as defined in the appended claims.

What is claimed is:

1. A pressure transducer system comprising pressure exposure means for being exposed to the fluid whose pressure is to be sensed, reference pressure means for obtaining a reference pressure, sensing means operatively connected to said pressure exposure means for sensing the pressure of the fluid exposed to the pressure exposure means and means operatively connected to said pressure exposure means and to said pressure sensing means for reducing pressure sensing errors caused by temperature variation comprising means for maintaining at least a portion of said pressure exposure means and at least a portion of said pressure sensing means at a substantially constant elevated temperature above the temperature of the environment surrounding at least a portion of said pressure transducer system comprising heating means, temperature sensing means for sensing the temperature of at least a portion of said pressure exposure means and at least a portion of said pressure sensing means and preheating means located adjacent to said temperature sensing means for preheating said temperature sensing means in advance of heat received from said heating means.

2. The pressure transducer system of claim 1 wherein said means for reducing pressure sensing errors also comprises thermal insulation means for thermally insulating at least a portion of said pressure exposure means and at least a portion of said pressure sensing means.

3. The pressure transducer system of claim 2 wherein said temperature elevation means also comprises thermal conduction means for conducting heat between at least a portion of said heating means, said temperature control means and said pressure exposure means.

4. The pressure transducer system of claim 2 wherein said preheating means comprises means for eliminating the need for thermally dependent components to attempt to obtain thermal stabilization or long burn in times and periodic zero and calibration checks.

5. The pressure transducer systsm of calim 4 wherein said preheating means comprises a lead resistor for providing heat to said temperature sensing means.

6. The pressure transducer system of claim 2 further comprising means for protecting said pressure transducer system from damage due to power supply reverse polarity.

7. The pressure transducer system of claim 6 further comprising means for protecting said pressure transducer system from damage due to overvoltage and high voltage transients.

* * * * *